(12) United States Patent
Howe (10) Patent No.: US 9,256,870 B1
(45) Date of Patent: Feb. 9, 2016

(54) METHODS AND SYSTEMS FOR UPDATING EXPIRY INFORMATION OF AN ACCOUNT

(71) Applicant: MasterCard International Incorporated, Purchase, NY (US)

(72) Inventor: Justin X. Howe, San Francisco, CA (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 14/558,262

(22) Filed: Dec. 2, 2014

(51) Int. Cl.
*G06Q 40/00* (2012.01)
*G06Q 20/38* (2012.01)

(52) U.S. Cl.
CPC .................... *G06Q 20/382* (2013.01)

(58) Field of Classification Search
CPC .......... G06K 19/077; G06K 19/07716; G06Q 20/105; G06Q 20/382; G06Q 20/385; G06Q 20/40; G06Q 20/4093; G07F 7/08; G07F 7/0806; G07F 7/084
USPC .................................................. 235/379, 380
See application file for complete search history.

(56) References Cited

U.S. PATENT DOCUMENTS

| | | | |
|---|---|---|---|
| 5,326,964 A | 7/1994 | Risser | |
| 5,538,291 A | 7/1996 | Gustafson | |
| 6,412,690 B1 | 7/2002 | Malki | |
| 7,793,851 B2 | 9/2010 | Mullen | |
| 7,806,323 B2 | 10/2010 | Fomitchev | |
| 8,201,747 B2* | 6/2012 | Brown et al. | 235/492 |
| 8,355,969 B2 | 1/2013 | Orr | |
| 8,706,623 B2 | 4/2014 | da Silva et al. | |
| 8,805,736 B2 | 8/2014 | Melik-Aslanian et al. | |
| 8,965,811 B2* | 2/2015 | Wankmueller | 705/79 |
| 2004/0128256 A1 | 7/2004 | Krouse et al. | |
| 2009/0171839 A1 | 7/2009 | Rosano et al. | |
| 2010/0125509 A1* | 5/2010 | Kranzley et al. | 705/17 |
| 2010/0174644 A1 | 7/2010 | Rosano et al. | |
| 2012/0296824 A1 | 11/2012 | Rosano | |
| 2013/0226803 A1 | 8/2013 | Hsu et al. | |
| 2014/0032409 A1 | 1/2014 | Rosano | |
| 2014/0195433 A1 | 7/2014 | de Almeida Ferreira da Silva et al. | |
| 2014/0236831 A1 | 8/2014 | Flitcroft et al. | |
| 2014/0250007 A1 | 9/2014 | Howe | |
| 2014/0250010 A1 | 9/2014 | Howe | |
| 2014/0258099 A1 | 9/2014 | Rosano | |
| 2015/0127547 A1* | 5/2015 | Powell et al. | 705/67 |

* cited by examiner

*Primary Examiner* — Seung Lee
(74) *Attorney, Agent, or Firm* — Armstrong Teasdale LLP (57) ABSTRACT

A method for updating expiry information of an account is provided. Additionally, a prediction computing device for updating expiry information of an account is provided. Further, a computer-readable storage medium having computer-executable instructions embodied thereon for updating expiry information of an account is provided.

20 Claims, 9 Drawing Sheets

METHODS AND SYSTEMS FOR UPDATING EXPIRY INFORMATION OF AN ACCOUNT

BACKGROUND

This disclosure relates to updating expiry information of an account, and more specifically to updating expiry information of an account for use in card-on-file (COF) transactions.

COF transactions allow cardholders to make purchases without the presence of a physical payment card. More specifically, a COF transaction is a type of card-not-present (CNP) transaction in which a merchant stores information about the payment card and initiates a transaction using the stored payment card information. Card-on-file recurring payment (COF/RP) transactions, a subset of COF transactions, are initiated by a merchant on a repeated basis for a particular cardholder. This payment method is designed to relieve cardholders of remembering to initiate recurring transactions with a merchant. For example, a cardholder subscribes to an online video streaming service that requires a monthly payment to keep the cardholder's subscription valid. Rather than requiring the cardholder to affirmatively initiate a transaction each month or pay for multiple months in advance, the merchant associated with the online video streaming service charges the cardholder for the service on a monthly basis using COF/RP transactions.

In known systems, in order for a merchant to initiate a COF transaction, the merchant stores payment card information for a cardholder in a merchant database. In at least some known systems, a merchant accesses a database of payment card information at a payment network (a payment network database) and compares the payment card information stored in the merchant database with corresponding payment card information in the payment network database. If updated payment information is within the payment network database, the merchant will then update its own database to include the new payment information. One difficulty with such systems arises when an issuer fails to provide updated payment card information to the payment network database, for example when an account reissuance occurs (i.e., due to an account data compromise event, a lost or stolen payment card being replaced, or a payment card being reissued because the expiration date has passed). In such instances, merchants may be unable to update their databases to include the updated payment card information and COF transactions are declined due to expired payment card information.

BRIEF DESCRIPTION OF THE DISCLOSURE

In one aspect, a method for updating expiry information of an account is provided. The method is implemented by a prediction computing device in communication with a payment network. The prediction computing device includes one or more processors and is in communication with a memory. The method includes receiving, by the prediction computing device, on a receipt date, a notification signal including an original PAN and a subsequent PAN for a first account having an original expiration date. The method additionally includes detecting, by the prediction computing device, that the payment processing network has processed at least one cleared payment transaction that includes the subsequent PAN and a subsequent expiration date associated with the first account. Additionally, the method includes determining, by the prediction computing device, an effective duration based on the original expiration date or by subtracting the receipt date from the subsequent expiration date, receiving, by the prediction computing device, a request signal requesting a predicted expiration date for a second account, the request signal including a PAN associated with the second account, determining, by the prediction computing device, that the effective duration applies to the second account based at least in part on the PAN associated with the second account, and generating, by the prediction computing device, a predicted expiration date for the second account, based on the effective duration.

In another aspect, a prediction computing device for updating expiry information of an account is provided. The prediction computing device includes one or more processors coupled to a memory and in communication with a payment network. The prediction computing device is configured to: receive, on a receipt date, a notification signal including an original PAN and a subsequent PAN for a first account having an original expiration date, detect that the payment processing network has processed at least one cleared payment transaction that includes the subsequent PAN and a subsequent expiration date associated with the first account, determine an effective duration based on the original expiration date or by subtracting the receipt date from the subsequent expiration date, receive a request signal requesting a predicted expiration date for a second account, the request signal including a PAN associated with the second account, determine that the effective duration applies to the second account based at least in part on the PAN associated with the second account, and generate a predicted expiration date for the second account, based on the effective duration.

In yet another aspect, a computer-readable storage medium having computer-executable instructions embodied thereon, wherein when executed by a prediction computing device having at least one processor coupled to a memory, the computer-executable instructions cause the prediction computing device to receive, on a receipt date, a notification signal including an original PAN and a subsequent PAN for a first account having an original expiration date, detect that the payment processing network has processed at least one cleared payment transaction that includes the subsequent PAN and a subsequent expiration date associated with the first account, determine an effective duration based on the original expiration date or by subtracting the receipt date from the subsequent expiration date, receive a request signal requesting a predicted expiration date for a second account, the request signal including a PAN associated with the second account, determine that the effective duration applies to the second account based at least in part on the PAN associated with the second account, and generate a predicted expiration date for the second account, based on the effective duration.

BRIEF DESCRIPTION OF THE DRAWINGS

FIGS. 1-9 show example embodiments of the methods and systems described herein.

DETAILED DESCRIPTION OF THE DISCLOSURE

Systems and methods of the present disclosure utilize data received from a credit reporting agency (CRA) on a regular basis to predict the new expiry date of a payment card. For example, the issuer assigns a new expiry date when performing an account reissuance (i.e., due to an account data compromise event, a lost or stolen payment card being replaced, or a payment card being reissued because the expiration date has passed). A received CRA report includes old primary account numbers (PAN) and new PANs segregated by bank identification number (BIN) and sorted by receipt date. Since issuers often use the same effective duration (length of time between receipt date and expiry date) for payment cards produced at similar times, it is possible to find related payment cards that have verified expiry dates, to generate an effective duration (assuming the similarity of the issue date and receipt date) for payment cards where a verified expiry date is lacking. Systems of the present disclosure add the effective duration to the receipt date of the payment card to generate a predicted expiration date. In some implementations, the system then stores the predicted expiration date in the payment network database in association with the payment card account. Merchants may then access the payment network database and update their own merchant databases with the new information prior to submitting a card-on-file transaction.

More specifically, at least some implementations include a prediction computing device in communication with, or included in, a payment network. The prediction computing device receives a notification signal on a receipt date. The notification signal includes an original PAN and a subsequent PAN for a first account having an original expiration date, where the subsequent PAN is the reissued version of the original PAN following an account data compromise event, lost/stolen card, or reissuance due to card expiry. The prediction computing device then detects that the payment processing network has processed at least one cleared payment transaction that includes the subsequent PAN and a subsequent expiration date associated with the first account. Additionally, the prediction computing device determines an effective duration (i.e., an amount of time that the issuer bank allows to pass before assigning a new expiration date to a payment card account). The prediction computing device determines the effective date based on the original expiration date or by subtracting the receipt date from the subsequent expiration date. Additionally, the prediction computing device receives a request signal requesting a predicted expiration date for a second account. For example, the request signal may be transmitted from one or more computing devices in the payment processing network. The request signal includes a PAN associated with the second account. The prediction computing device determines that the effective duration applies to the second account based at least in part on the PAN associated with the second account. For example, in at least some implementations, the prediction computing device stores the bank identification number and/or issuer bank associated with the first payment card account and determines that the second PAN includes the BIN. In other words, the prediction computing device determines that the first payment card account and the second payment card account are associated with the same issuer bank. The prediction computing device additionally generates a predicted expiration date for the second account associated with the issuing bank, based on the effective duration that the prediction computing device determined earlier for the first payment card account and the associated issuing bank.

At least one technical problem addressed by the systems and methods described herein is as follows. When updated payment card information is not updated at the merchant for COF transactions, then stale payment card information is processed by the payment network, and the transactions are declined by issuers. This results in system resources being unnecessarily used. In addition, other resources are needed to correct the account information so that the transaction can be properly run. This results in, among other negative effects, unnecessary delays in payment, frustrations for all parties involved, and slow networks.

The methods and systems described herein may be implemented using computer programming or engineering techniques including computer software, firmware, hardware or any combination or subset thereof, wherein the technical effect is achieved by performing at least one of: (a) receiving on a receipt date, a notification signal including an original PAN and a subsequent PAN for a first account having an original expiration date; (b) detecting that a payment processing network has processed at least one cleared payment transaction that includes the subsequent PAN and a subsequent expiration date associated with the first account; (c) determining an effective duration based on the original expiration date or by subtracting the receipt date from the subsequent expiration date; (d) receiving a request signal requesting a predicted expiration date for a second account, the request signal including a PAN associated with the second account; (e) determining that the effective duration applies to the second account based at least in part on the PAN associated with the second account; and (f) generating a predicted expiration date for the second account, based on the effective duration. The technical effects described herein provide the technical advantage of decreasing the number of declined card-on-file payment transactions that would otherwise occur in a conventional payment network, and thereby increases the speed at which a payment network can process payment transactions. The resulting technical effect is improved network speed by reducing stale messages being sent over the network only to be rejected and re-run through the network. Also, in addition to increased speed, more efficient payments are made because parties are being paid more quickly.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. In other words, the terms "transaction card," "financial transaction card," and "payment card" refer to a cashless payment method and/or device. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
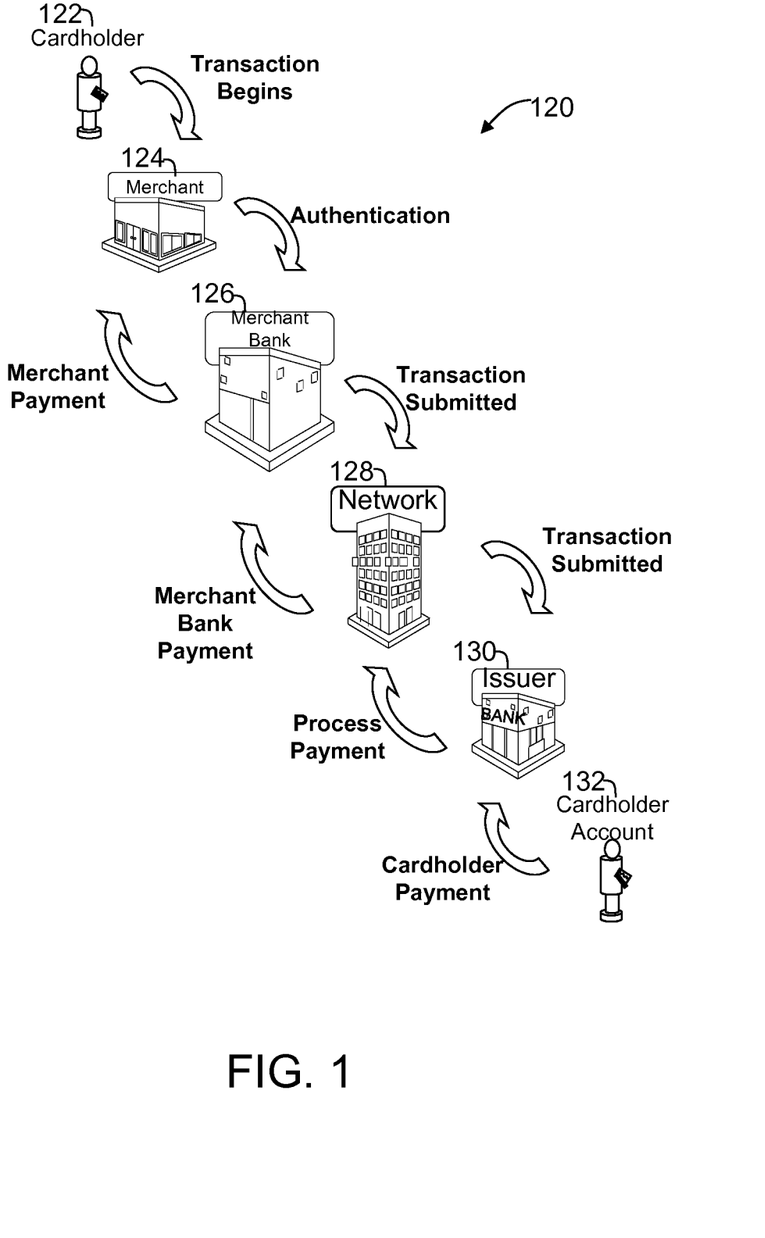
FIG. 1 is a schematic diagram illustrating an example multi-party payment card industry system for enabling payment-by-card transactions in which merchants and card issuers do not necessarily have a one-to-one relationship.

FIG. 1 is a schematic diagram illustrating an example multi-party payment card system 120 for enabling payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself. Such transactions are referred to herein as card-on-file (COF) transactions.

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

Figure 2:
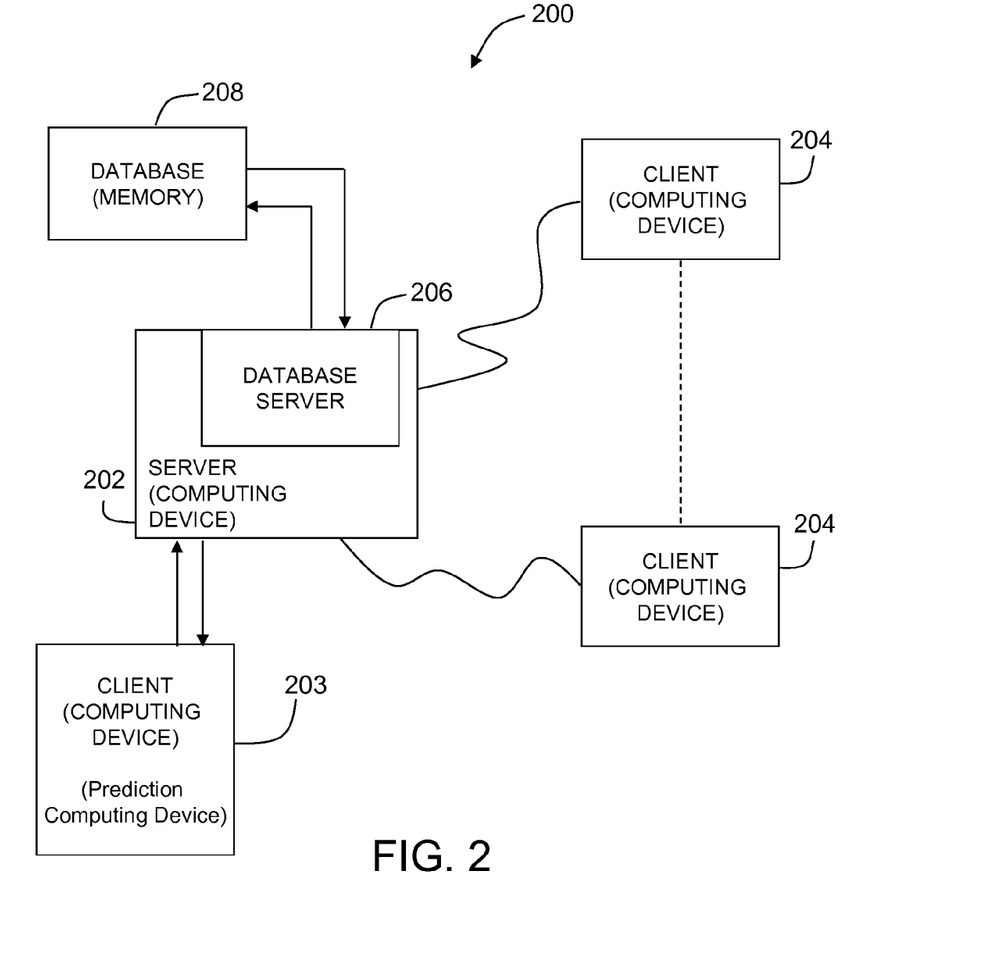
FIG. 2 is a simplified block diagram of an example payment processing system including a payment processing server computing device, a prediction computing device, and a plurality of computing devices in accordance with one example embodiment of the present disclosure.

FIG. 2 is a simplified block diagram of an example payment processing system 200 with a prediction computing device 203 in accordance with one embodiment of the present disclosure. In the example embodiment, system 200 includes a payment processing server computing device 202, prediction computing device 203 and a plurality of client subsystems, also referred to as client systems 204 or client computing devices, connected to payment processing server computing device 202. In one embodiment, client systems 204 are computers including a web browser, such that prediction computing device 203 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on prediction computing device 203 and may be accessed by potential users at one of client systems 204 by logging onto prediction computing device 203 through one of client systems 204. In any alternative embodiment, database 208 is stored remotely from prediction computing device 203 and may be non-centralized. Prediction computing device 203 could be any type of computing device configured to perform the steps described herein. As discussed below, payment card accounts, primary account numbers (PANs), payment card expiration dates, payment transactions, and effective durations associated with payment card expiration dates are stored in database 208.

Figure 3:
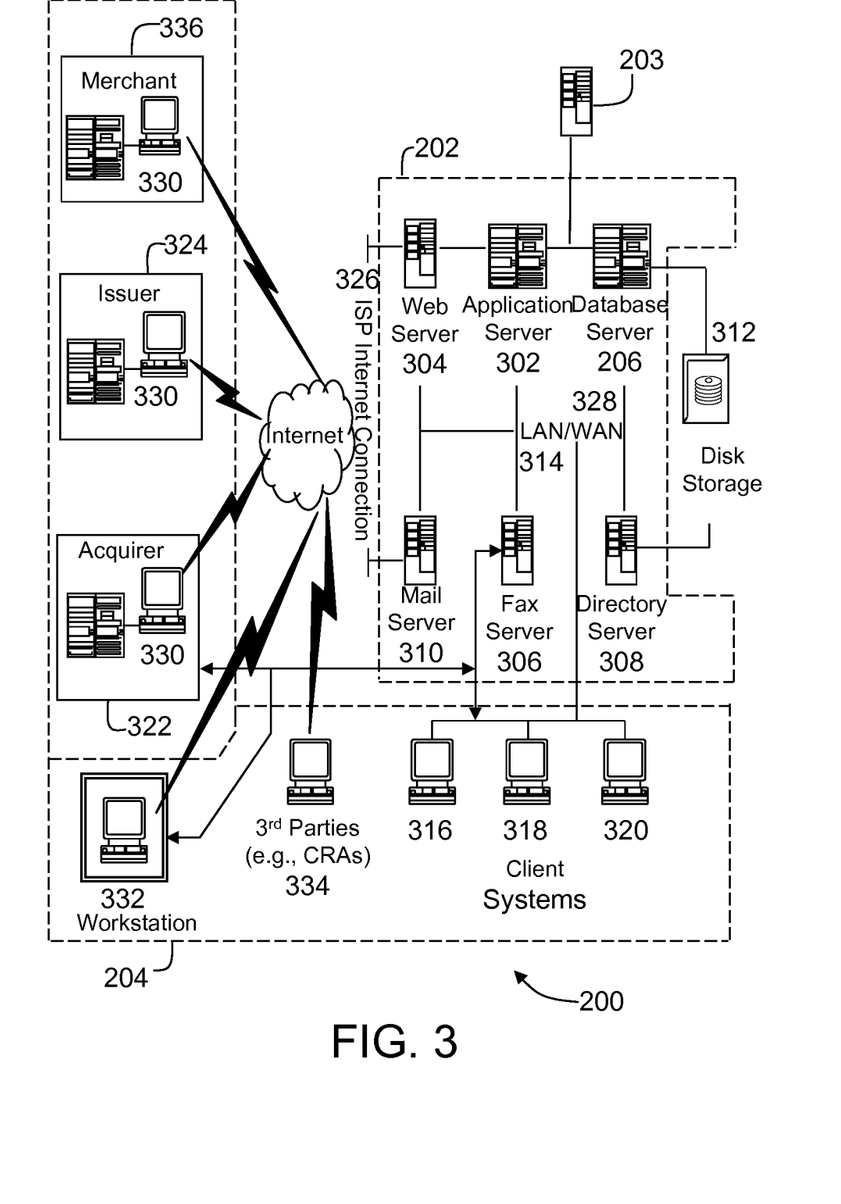
FIG. 3 is an expanded block diagram of an example embodiment of a server architecture of the payment processing system including the plurality of computing devices in accordance with one example embodiment of the present disclosure.

FIG. 3 is an expanded block diagram of an example embodiment of a server architecture of payment processing system 200 in accordance with one embodiment of the present disclosure. Payment processing system 200 includes prediction computing device 203 and client systems 204. Prediction computing device 203 further includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Prediction computing device 203 is configured to be communicatively coupled to various entities, including acquirers 322 and issuers 324, and to third parties, e.g., credit reporting agencies (CRAs), 334 using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with prediction computing device 203. Furthermore, fax server 306 communicates with remotely located client systems, including a client system 332, using a telephone link. Fax server 306 is configured to communicate with other client systems 316, 318, and 320 as well.

Figure 4:
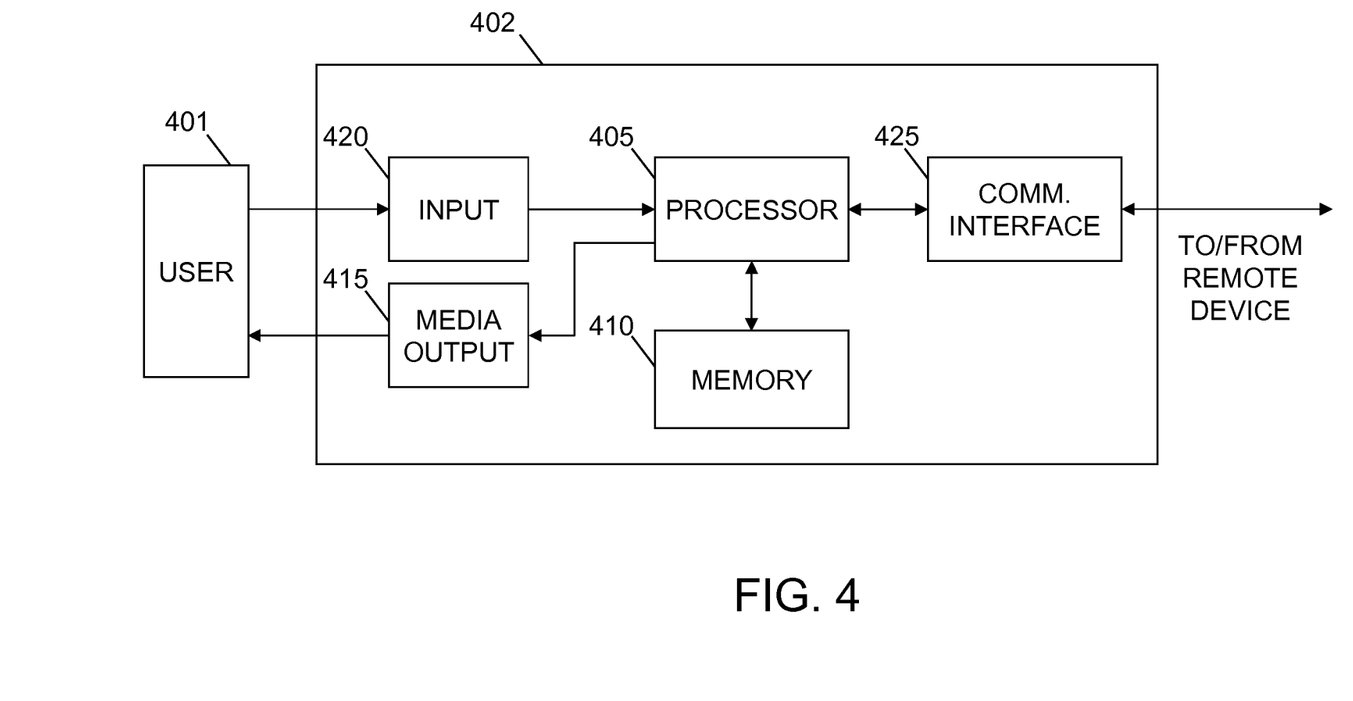
FIG. 4 illustrates a configuration of a client system shown in FIGS. 2 and 3 in accordance with one example embodiment of the present disclosure.

FIG. 4 illustrates an example configuration of a cardholder computing device 402 operated by a cardholder 401. Cardholder computing device 402 may include, but is not limited to, client systems ("client computing devices") 204, 316, 318, and 320, workstation 330, and manager workstation 332 (shown in FIG. 3).

Cardholder computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Cardholder computing device 402 also includes at least one media output component 415 for presenting information to cardholder 401. Media output component 415 is any component capable of conveying information to cardholder 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from cardholder 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to cardholder 401 via media output component 415 and, optionally, receiving and processing input from input device 420. A user interface may include, among other possibilities, a web browser and client application. Web browsers enable users, such as cardholder 401 or other user, to display and interact with media and other information typically embedded on a web page or a website from a web server associated with a merchant. A client application allows cardholder 401 or other user to interact with a server application associated with a merchant.

Figure 5:
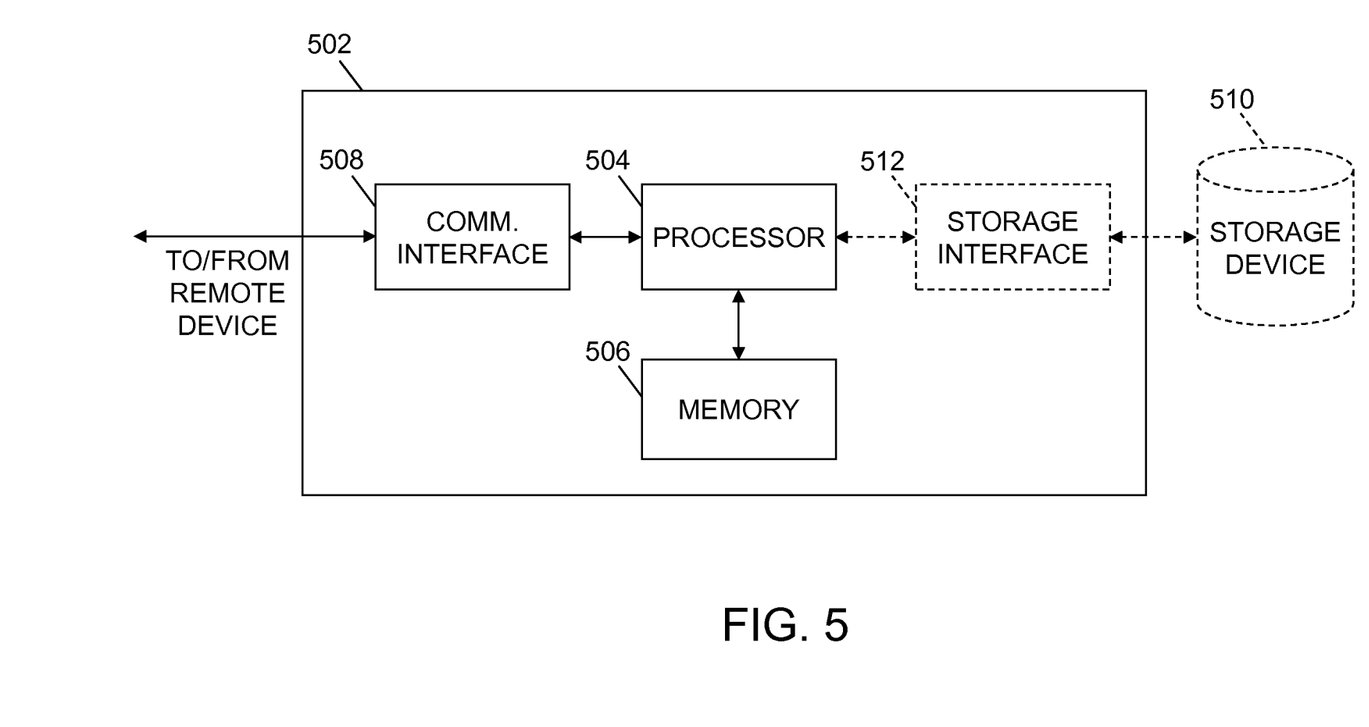
FIG. 5 illustrates a configuration of a server system shown in FIGS. 2 and 3 in accordance with one example embodiment of the present disclosure.

FIG. 5 illustrates an example configuration of a server computing device 502 such as prediction computing device 203 (shown in FIGS. 2 and 3). Server computing device 502 may include, but is not limited to, database server 206, application server 302, web server 304, fax server 306, directory server 308, and mail server 310.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. In some implementations, storage device 510 includes multiple storage units such as hard disks or solid state disks in a redundant array of inexpensive disks (RAID) configuration. In some implementations, storage device 510 includes a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
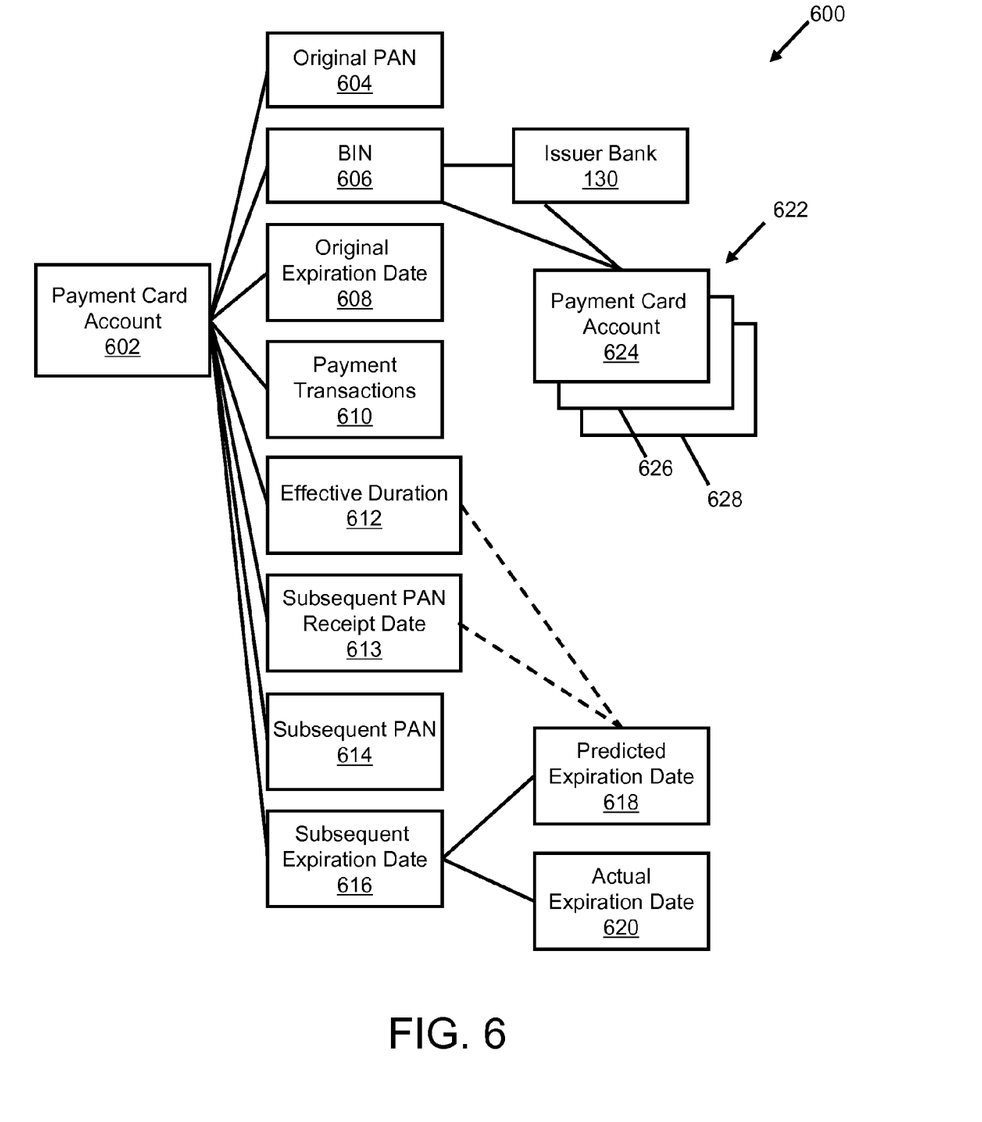
FIG. 6 is a diagram of data stored by the payment processing system and the prediction computing device in association with a payment card account in accordance with an example embodiment of the present disclosure.

FIG. 6 is a diagram of data 600 stored by payment processing system 200 and prediction computing device 203 in association with a payment card account 602. Data 600 is stored, for example, in database 208. Payment card account 602 is associated with an original payment account number (PAN) 604. Additionally, payment card account 602 is associated with a bank identification number (BIN) 606, which is associated with issuer bank 130. In some implementations, BIN 606 is included or encoded in original PAN 604. In some implementations, issuer bank 130 is associated with a plurality of BINs.

Figure 7:
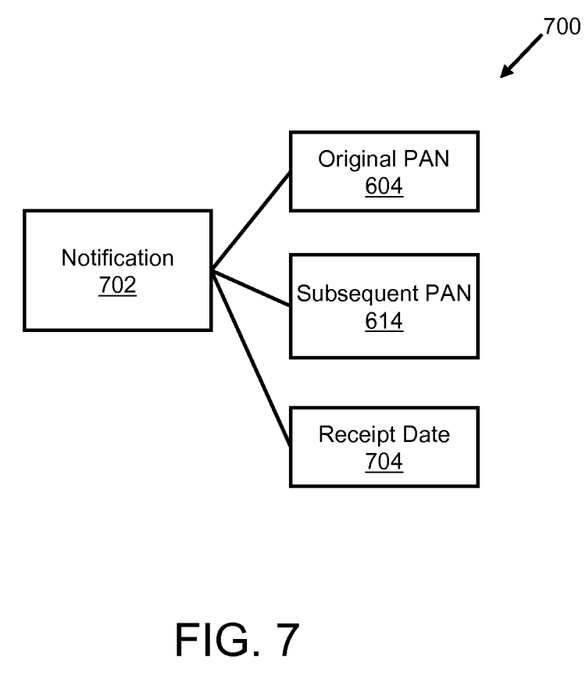
FIG. 7 is a diagram of data associated with a notification received by the prediction computing device in accordance with an example embodiment of the present disclosure.

Additionally, payment card account 602 is associated with an original expiration date 608. Further, payment card account 602 is stored in association with one or more records of payment transactions 610, which at least in some implementations, include indications of whether each payment transaction cleared, whether the transaction was a card-present or card-on-file transaction, and related data. Prediction computing device 203 determines and stores an effective duration 612 in association with payment card account 602, as described in more detail herein. Additionally, payment card account 602 is associated with a subsequent PAN receipt date 613. In some implementations, prediction computing device 206 stores subsequent PAN receipt date 613 as the date on which prediction computing device 206 receives notification signal including notification 702 (FIG. 7). Payment processing system 200 stores a subsequent primary account number 614 and a subsequent expiration date 616 in association with payment card account 602. Subsequent expiration date 616 is one of (i) a predicted expiration date 618 calculated by prediction computing device 203, as described in more detail herein, (ii) an actual expiration date 620, set by issuer bank 130, and (iii) an actual expiration date pulled from transaction data. The term "original", as used herein in association with a PAN or expiration date means that the PAN or expiration date precedes a subsequent PAN or expiration date, and does not necessarily mean that the PAN or expiration date is the first PAN or expiration date that has ever been associated with payment card account 602. Additionally, payment processing system 200 and prediction computing device 203 store the above-described types of data for a plurality of other payment card accounts 622, associated with BIN 606, and/or issuer bank 130. Plurality of payment card accounts 622 includes a second payment card account 624, a third payment card account 626, and a fourth payment card account 628. In other implementations, the number of payment card accounts stored by payment processing system 200 and prediction computing device 203 in association with BIN 606 and/or issuer bank 130 is different than four. Additionally, in some implementations, payment processing system 200 and prediction computing device 203 store additional payment card accounts (not shown) in association with different BINs and/or issuer banks.

FIG. 7 is a diagram of data 700 associated with a notification 702 received by prediction computing device 203. More specifically, prediction computing device 203 receives notification 702, for example in a notification signal, from a credit reporting agency (CRA) (e.g., third party 334). Notification 702 identifies original PAN 604 and subsequent PAN 614 for payment card account 602. More specifically, at least in some implementations, notification 702 indicates that issuer bank 130 has replaced original PAN 604 associated with payment card account 602 with subsequent PAN 614, due to for example, the scheduled expiration of the payment card and/or security precautions. In some implementations, original PAN 604 and subsequent PAN 614 are the same number. More specifically, in at least some instances, issuer bank 130 has assigned a subsequent expiration date to the payment card account without changing the PAN. Notification 702 is additionally associated with a receipt date 704, which, in at least some implementations, is the date that prediction computing device 203 receives a notification signal representing notification 702 from third party 334. In some implementations, receipt date 704 is a date specified in notification 702 indicating when a subsequent expiration date has been assigned to payment card account 602 and/or when subsequent PAN 614 replaced original PAN 604 for payment card account 602 or the date when a pair of old/new PAN data is received from a CRA. In some implementations, notification 702 pertains to a plurality of payment card accounts. For example, notification 702 may additionally indicate an original PAN and subsequent PAN for each of plurality of payment card accounts 622. In other implementations, prediction computing device 203 receives multiple notification signals, each representing a respective notification 702, for example on different receipt dates, pertaining to original PANs and subsequent PANs for multiple different payment card accounts (e.g., payment card accounts 622).

Figure 8:
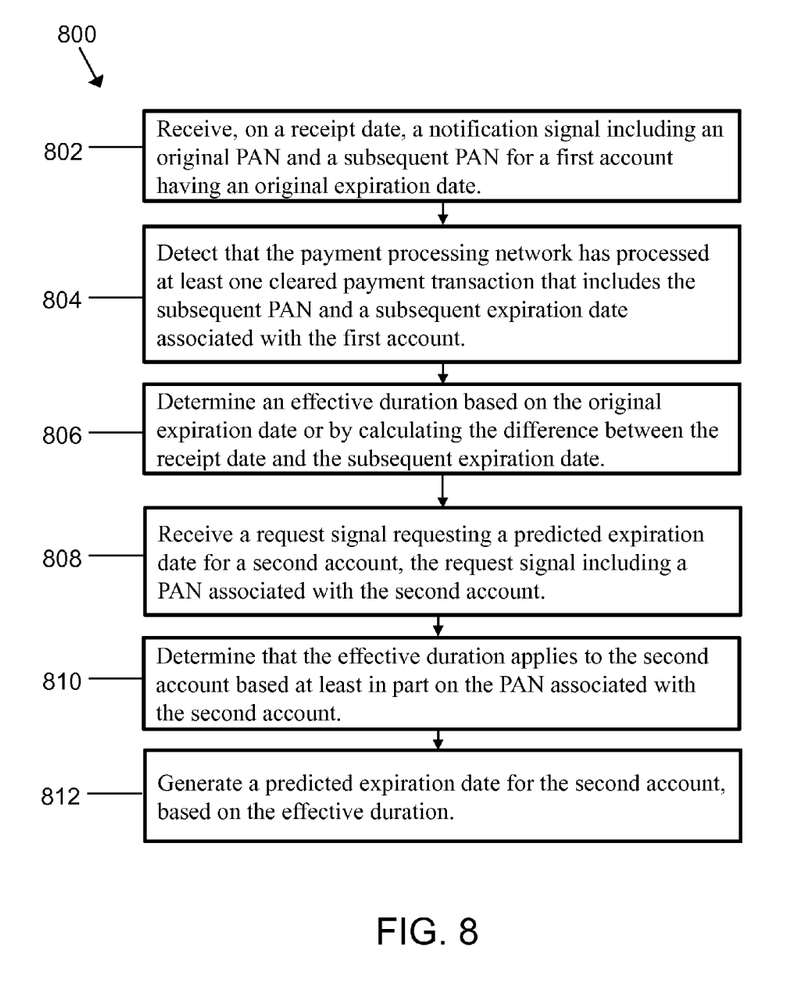
FIG. 8 is a flowchart of an example process implemented by the prediction computing device for updating expiry information of an account in one example embodiment of the present disclosure.

FIG. 8 is a flowchart of an example process 800 implemented by prediction computing device 203 for updating expiry information (e.g., subsequent expiration date 616) of an account (e.g., second payment card account 624). Initially, prediction computing device 203 receives 802, on a receipt date (e.g., receipt date 704), a notification signal (e.g., notification 702) including an original PAN (e.g., original PAN 604) and a subsequent PAN (e.g., subsequent PAN 614) for a first account (e.g., first payment card account 602) having an original expiration date (e.g., original expiration date 608). Additionally, prediction computing device 203 detects 804 that the payment processing network (e.g., payment processing system 200) has processed at least one cleared payment transaction that includes the subsequent PAN (e.g., subsequent PAN 614) and a subsequent expiration date (e.g., subsequent expiration date 616) associated with the first account (e.g., first payment card account 602). Additionally, prediction computing device 203 determines 806 an effective duration (e.g., effective duration 612) based on the original expiration date (e.g., original expiration date 608) or by calculating the difference between the receipt date (e.g., receipt date 704) and the subsequent expiration date (e.g., subsequent expiration date 616), for example by subtracting the receipt date (e.g., receipt date 704) from the subsequent expiration date (e.g., subsequent expiration date 616). For example, in some implementations, prediction computing device 203 calculates the time period between an issuance date associated with the original PAN 604 and the original expiration date 608 and stores the time period as the effective duration 612. Further, prediction computing device 203 receives 808 a request signal requesting a predicted expiration date (e.g., predicted expiration date 618) for a second account (e.g., second payment card account 624), the request signal including a PAN associated with the second account (e.g., an original PAN 604). Additionally, prediction computing device 203 determines 810 that the effective duration (e.g., effective duration 612) applies to the second account (e.g., second payment card account 624) based at least in part on the PAN associated with the second account (e.g., second payment card account 624). In addition, prediction computing device 203 generates 812 a predicted expiration date (e.g., predicted expiration date 618) for the second account (e.g., second payment card account 624), based on the effective duration (e.g., effective duration 612). Process 800 may operate prospectively and/or retroactively.

In some implementations, the first account is a first payment card account (e.g., first payment card account 602), and generating a predicted expiration date for the second account (e.g., second payment card account 624) further includes generating a predicted expiration date (e.g., predicted expiration date 618) for a second payment card account (e.g., second payment card account 624). In some implementations, detecting that the payment processing network (e.g., payment processing system 200) has processed at least one cleared payment transaction further includes receiving, by the prediction computing device 203, an alert signal from the payment processing network (e.g., payment processing system 200) that includes the subsequent PAN (e.g., subsequent PAN 614) and the subsequent expiration date (e.g., subsequent expiration date 616) associated with the first account (e.g., first payment card account 602). In some implementations, prediction computing device 203 stores a bank identification number (BIN) (e.g., BIN 606) in association with the first account (e.g., first payment card account 602) and determines that the effective duration (e.g., effective duration 612) applies to the second account (e.g., second payment card account 624) by detecting the BIN (e.g., BIN 606) encoded in the PAN associated with the second account.

In some implementations, prediction computing device 203 additionally receives a request signal from a merchant computing device (e.g., computing device 204) to access the predicted expiration date (e.g., predicted expiration date 618) and transmits the predicted expiration date (e.g., predicted expiration date 618) to the merchant computing device 204. In some implementations, prediction computing device 203 determines an average effective duration or confidence level based on a plurality of PANs associated with an issuing bank (e.g., issuer bank 130). For example, in some implementations, prediction computing device 203 determines a dispersion of duration values and determines a confidence level in the effective duration and/or predicted expiration date based on the dispersion. In some implementations, the notification signal (e.g., notification 702) additionally includes an original PAN (e.g., an original PAN 604) for the second account (e.g., second payment card account 624) and a subsequent PAN (e.g., a subsequent PAN 614) for the second account (e.g., second payment card account 624), and prediction computing device 203 generates the predicted expiration date (e.g., predicted expiration date 618) for the second account (e.g., second payment card account 624) by adding the effective duration (e.g., effective duration 612) to the receipt date (e.g., receipt date 704).

In some implementations, the notification signal (e.g., notification 702) is a first notification signal, and prediction computing device 203 receives a second notification signal on a second receipt date. The second notification signal indicates that an original PAN for the second account (e.g., second payment card account 624) has been replaced with a subsequent PAN for the second account (e.g., second payment card account 624). In such implementations, prediction computing device 203 generates the predicted expiration date (e.g., predicted expiration date 618) for the second account (e.g., second payment card account 624) by adding the effective duration (e.g., effective duration 612) to the second receipt date.

In some implementations, payment processing system 200 processes at least one card-present transaction for a subsequent PAN (e.g., subsequent PAN 614) for the second account (e.g., second payment card account 624), identifies an actual expiration date (e.g., actual expiration date 620) for the subsequent PAN (e.g., subsequent PAN 614) for the second account (e.g., second payment card account 624), based on the at least one card-present transaction, and replaces the predicted expiration date (e.g., predicted expiration date 618) with the actual expiration date (e.g., actual expiration date 620) for the second account (e.g., second payment card account 624) in the memory (e.g., database 208). In some implementations, payment processing system 200 receives an authorization request message for a card-on-file transaction. The authorization request message includes an original PAN (e.g., original PAN 604) for the second account (e.g., second payment card account 624) and an original expiration date (e.g., original expiration date 608) for the second account (e.g., second payment card account 624). Additionally, payment processing system 200 replaces the original expiration date (e.g., original expiration date 608) for the second account (e.g., second payment card account 624) with the predicted expiration date (e.g., predicted expiration date 618) in the authorization request message and transmits the authorization request message to an issuing bank (e.g., issuer bank 130).

Figure 9:
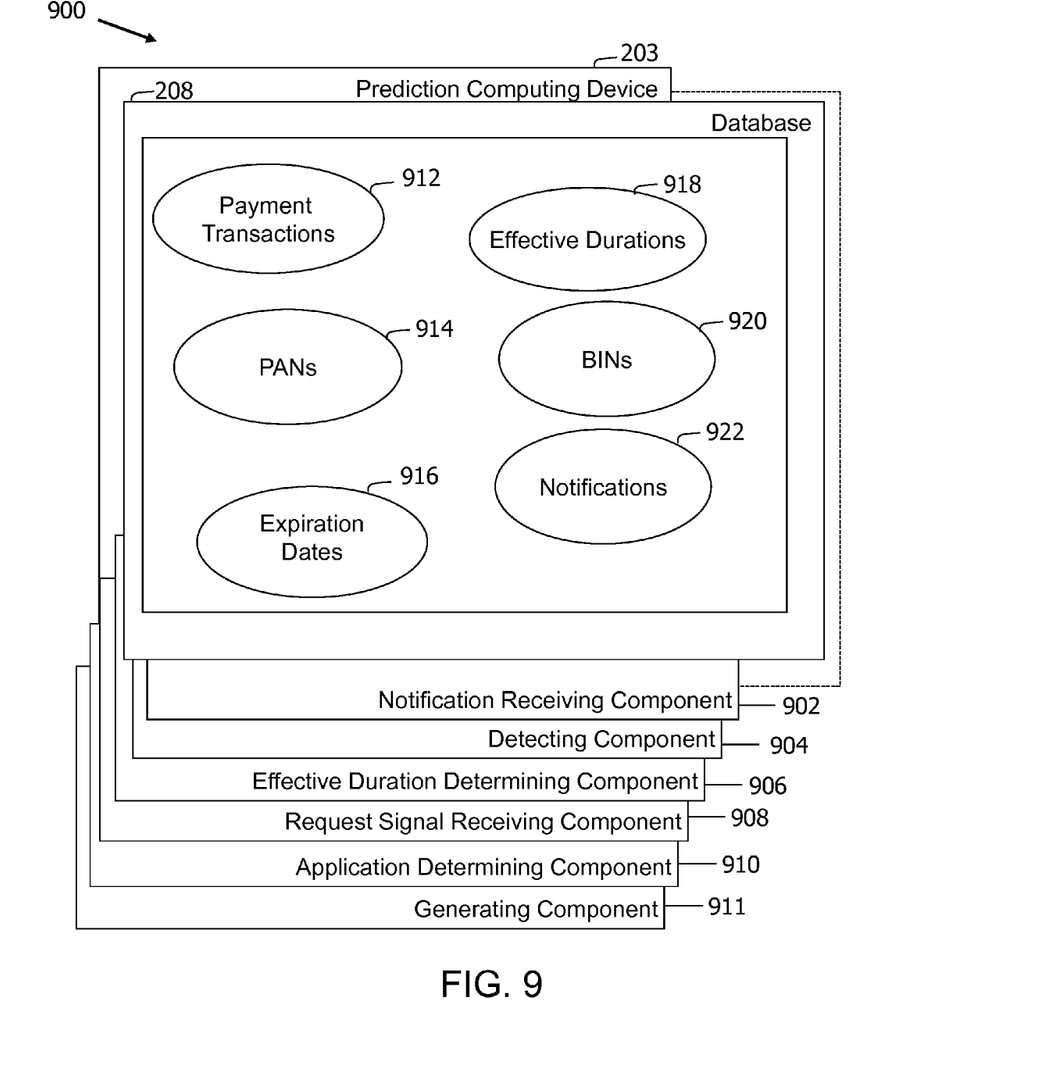
FIG. 9 is a diagram of components of one or more example computing devices that may be used in the system shown in FIG. 2.

FIG. 9 is a diagram 900 of components of one or more example computing devices, for example, prediction computing device 203, that may be used in embodiments of the described systems and methods. FIG. 9 further shows a configuration of database 208 (FIG. 2). Database 208 is coupled to several separate components within prediction computing device 203, which perform specific tasks.

Prediction computing device 203 includes a notification receiving component 902 for receiving, on a receipt date, a notification signal including an original PAN and a subsequent PAN for a first account. Additionally, prediction computing device 203 includes a detecting component 904 for detecting that the payment processing network has processed at least one cleared payment transaction that includes the subsequent PAN and a subsequent expiration date associated with the first account. Additionally, prediction computing device 203 includes an effective duration determining component 906 for determining an effective duration by calculating the difference between the receipt date and the subsequent expiration date. Additionally, prediction computing device 203 includes a request signal receiving component 908 for receiving a request signal requesting a predicted expiration date for a second account, the request signal including a PAN associated with the second account. Further, prediction computing device 203 includes an application determining component 910 for determining that the effective duration applies to the second account based at least in part on the PAN associated with the second account. Additionally, prediction computing device 203 includes a generating component 911 for generating a predicted expiration date for the second account, based on the effective duration.

In an example embodiment, database 208 is divided into a plurality of sections, including but not limited to, a payment transactions section 912, a PANs section 914, an expiration dates section 916, an effective durations section 918, a BINs section 920, and a notifications section 922. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for updating expiry information of a payment card account generate a predicted expiration date associated with a new PAN for a payment card account, based at least in part on determining an effective duration between expiration dates for payment card accounts associated with a particular BIN or issuer bank. As a result, the methods and systems described herein decrease the likelihood that card-on-file transactions are declined due to incorrect expiration date information stored by merchants.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for updating expiry information of an account, said method is implemented by a prediction computing device in communication with a payment network, the prediction computing device includes one or more processors and is in communication with a memory, said method comprising:

receiving, by the prediction computing device, on a receipt date, a notification signal including an original primary account number (PAN) and a subsequent PAN for a first account having an original expiration date;

detecting, by the prediction computing device, that the payment processing network has processed at least one cleared payment transaction that includes the subsequent PAN and a subsequent expiration date associated with the first account;

determining, by the prediction computing device, an effective duration based on the original expiration date or by calculating the difference between the receipt date and the subsequent expiration date;

receiving, by the prediction computing device, a request signal requesting a predicted expiration date for a second account, the request signal including a PAN associated with the second account;

determining, by the prediction computing device, that the effective duration applies to the second account based at least in part on the PAN associated with the second account; and generating, by the prediction computing device, a predicted expiration date for the second account, based on the effective duration.

2. The method of claim 1, wherein the first account is a first payment card account and generating a predicted expiration date for the second account further comprises generating a predicted expiration date for a second payment card account.

3. The method of claim 1, wherein detecting that the payment processing network has processed at least one cleared payment transaction further comprises receiving, by the prediction computing device, an alert signal from the payment processing network that includes the subsequent PAN and the subsequent expiration date associated with the first account.

4. The method of claim 1, further comprising storing a bank identification number (BIN) in association with the first account, and wherein determining that the effective duration applies to the second account further comprises detecting, by the prediction computing device, the BIN encoded in the PAN associated with the second account.

5. The method of claim 1, further comprising:
receiving a request signal from a merchant computing device to access the predicted expiration date; and
transmitting the predicted expiration date to the merchant computing device.

6. The method of claim 1, wherein determining the effective duration further comprises determining an average effective duration or confidence level based on a plurality of PANs associated with an issuing bank.

7. The method of claim 1, wherein the notification signal additionally includes an original PAN for the second account and a subsequent PAN for the second account, and generating the predicted expiration date for the second account further comprises adding the effective duration to the receipt date.

8. The method of claim 1, wherein the notification signal is a first notification signal, said method further comprising receiving a second notification signal on a second receipt date, wherein the second notification signal indicates that an original PAN for the second account has been replaced with a subsequent PAN for the second account, and generating the predicted expiration date for the second account further comprises adding the effective duration to the second receipt date.

9. The method of claim 1, further comprising:
processing at least one card-present transaction for a subsequent PAN for the second account;
identifying an actual expiration date for the subsequent PAN for the second account, based on the at least one card-present transaction; and
replacing the predicted expiration date with the actual expiration date for the second account in the memory.

10. The method of claim 1, further comprising:
receiving an authorization request message for a card-on-file transaction, the authorization request message including an original PAN for the second account and an original expiration date for the second account;
replacing the original expiration date for the second account with the predicted expiration date in the authorization request message; and
transmitting the authorization request message to an issuing bank.

11. A prediction computing device for updating expiry information of an account, the prediction computing device comprising one or more processors coupled to a memory and in communication with a payment network, said prediction computing device configured to:

receive, on a receipt date, a notification signal including an original primary account number (PAN) and a subsequent PAN for a first account having an original expiration date;
detect that the payment processing network has processed at least one cleared payment transaction that includes the subsequent PAN and a subsequent expiration date associated with the first account;
determine an effective duration based on the original expiration date or by calculating the difference between the receipt date and the subsequent expiration date;
receive a request signal requesting a predicted expiration date for a second account, the request signal including a PAN associated with the second account;
determine that the effective duration applies to the second account based at least in part on the PAN associated with the second account; and
generate a predicted expiration date for the second account, based on the effective duration.

12. The prediction computing device of claim 11, wherein the first account is a first payment card account, and said prediction computing device is further configured such that generating a predicted expiration date for the second account further includes generating a predicted expiration date for a second payment card account.

13. The prediction computing device of claim 11, further configured such that detecting that the payment processing network has processed at least one cleared payment transaction further includes receiving an alert signal from the payment processing network that includes the subsequent PAN and the subsequent expiration date associated with the first account.

14. The prediction computing device of claim 11, further configured to:
store a bank identification number (BIN) in association with the first account; and
determine that the effective duration applies to the second account by detecting the BIN encoded in the PAN associated with the second account.

15. The prediction computing device of claim 11, further configured to:
receive a request signal from a merchant computing device to access the predicted expiration date; and
transmit the predicted expiration date to the merchant computing device.

16. The prediction computing device of claim 11, further configured to determine the effective duration by determining an average effective duration or confidence level based on a plurality of PANs associated with an issuing bank.

17. The prediction computing device of claim 11, wherein the notification signal additionally includes an original PAN for the second account and a subsequent PAN for the second account, and said prediction computing device is further configured such that generating the predicted expiration date for the second account further includes adding the effective duration to the receipt date.

18. The prediction computing device of claim 11, wherein the notification signal is a first notification signal and said prediction computing device is further configured to:
receive a second notification signal on a second receipt date, wherein the second notification signal indicates that an original PAN for the second account has been replaced with a subsequent PAN for the second account; and
generate the predicted expiration date for the second account by adding the effective duration to the second receipt date.

19. A computer-readable storage medium having computer-executable instructions embodied thereon, wherein when executed by a prediction computing device having at least one processor coupled to a memory, the computer-executable instructions cause the prediction computing device to:

receive, on a receipt date, a notification signal including an original primary account number (PAN) and a subsequent PAN for a first account having an original expiration date;

detect that the payment processing network has processed at least one cleared payment transaction that includes the subsequent PAN and a subsequent expiration date associated with the first account;

determine an effective duration based on the original expiration date or by calculating the difference between the receipt date and the subsequent expiration date;

receive a request signal requesting a predicted expiration date for a second account, the request signal including a PAN associated with the second account;

determine that the effective duration applies to the second account based at least in part on the PAN associated with the second account; and generate a predicted expiration date for the second account, based on the effective duration.

20. The computer-readable medium of claim 19, wherein said computer-executable instructions further cause the prediction computing device to:

store a bank identification number (BIN) in association with the first account; and determine that the effective duration applies to the second account by detecting the BIN encoded in the PAN associated with the second account.

* * * * *